(12) United States Patent
Dickinson (10) Patent No.: US 10,604,014 B1
(45) Date of Patent: Mar. 31, 2020

(54) TACHOMETER DISPLAY SYSTEM AND METHOD FOR DISPLAY

(71) Applicant: Honda Motor Co., Ltd., Tokyo, Minato-ku (JP)

(72) Inventor: Michael T. Dickinson, Marysville, OH (US)

(73) Assignee: Honda Motors Co., Ltd., Tokyo (JP)

( * ) Notice: Subject to any disclaimer, the term of this patent is extended or adjusted under 35 U.S.C. 154(b) by 0 days.

(21) Appl. No.: 16/292,997

(22) Filed: Mar. 5, 2019

(51) Int. Cl.
*B60Q 1/00* (2006.01)
*B60K 35/00* (2006.01)
*G01D 13/02* (2006.01)
*G01D 13/22* (2006.01)

(52) U.S. Cl.
CPC ............ *B60K 35/00* (2013.01); *G01D 13/02* (2013.01); *G01D 13/22* (2013.01)

(58) Field of Classification Search
CPC ......... B60K 35/00; G01D 13/02; G01D 13/22
USPC .......................................................... 340/441
See application file for complete search history.

(56) References Cited

U.S. PATENT DOCUMENTS

| 4,179,938 | A |   | 12/1979 | Schramm |   |
|---|---|---|---|---|---|
| 4,947,681 | A |   | 8/1990 | Young |   |
| 5,020,361 | A | * | 6/1991 | Malecki | ............... B60R 16/0236 116/DIG. 20 |
| 6,137,399 | A | * | 10/2000 | Westberg | .................... G01P 1/08 324/160 |
| 2005/0073399 | A1 |   | 4/2005 | Tsuruhara et al. |   |
| 2006/0092098 | A1 | * | 5/2006 | Yokota | .................... B60K 35/00 345/33 |
| 2007/0132572 | A1 | * | 6/2007 | Itoh | ......................... B60K 35/00 340/462 |
| 2008/0007393 | A1 | * | 1/2008 | Kanzaka | ................ B60K 35/00 340/441 |
| 2008/0123322 | A1 |   | 5/2008 | Tane et al. |   |
| 2009/0009983 | A1 | * | 1/2009 | Eich | ....................... B60K 35/00 362/23.18 |
| 2009/0030584 | A1 | * | 1/2009 | Meng | ...................... F16H 63/42 701/64 |
| 2009/0240396 | A1 | * | 9/2009 | Sullivan | .................... B60Q 9/00 701/36 |
| 2009/0322505 | A1 | * | 12/2009 | Sullivan | .................... B60Q 9/00 340/438 |
| 2011/0043348 | A1 | * | 2/2011 | Blackard | ................. F16H 63/42 340/439 |

(Continued)

FOREIGN PATENT DOCUMENTS

| EP | 1930631 A2 | 11/2008 |
| JP | S6287861 A | 4/1987 |
| JP | 2008265566 A | 11/2008 |

*Primary Examiner* — Kerri L McNally
*Assistant Examiner* — Thang D Tran
(74) *Attorney, Agent, or Firm* — Plumsea Law Group, LLC (57) ABSTRACT

A tachometer display system and method is provided. In one embodiment, a tachometer display system includes a tachometer for indicating a plurality of engine speeds. The tachometer is configured to display a current engine speed based on a current gear ratio of a manual transmission. At least two synchronous shift point indicators are displayed at variable locations near the tachometer. Each synchronous shift point indicator is displayed near a location on the tachometer associated with an engine speed that corresponds to a transmission input shaft speed for a downshifted gear ratio of the manual transmission from the current gear ratio.

20 Claims, 8 Drawing Sheets

(56) References Cited

U.S. PATENT DOCUMENTS

| | | | | |
|---|---|---|---|---|
| 2013/0079986 A1* | 3/2013 | Ozawa | ............... | B60K 37/02 |
| | | | | 701/36 |
| 2014/0167948 A1* | 6/2014 | Mejia | ................ | B60K 37/02 |
| | | | | 340/441 |
| 2014/0257653 A1* | 9/2014 | Sato | ................ | B60K 6/445 |
| | | | | 701/55 |
| 2014/0336884 A1* | 11/2014 | Roder | ............... | B60W 30/18 |
| | | | | 701/51 |
| 2016/0093209 A1* | 3/2016 | Matsumura | ........... | G01D 13/28 |
| | | | | 340/441 |
| 2016/0142689 A1* | 5/2016 | Karikomi | ............ | G01D 11/28 |
| | | | | 348/745 |
| 2016/0159219 A1* | 6/2016 | Yamada | ............. | B60K 35/00 |
| | | | | 340/438 |
| 2016/0187169 A1* | 6/2016 | Gil Paredes | ........ | G01D 13/265 |
| | | | | 116/288 |
| 2016/0252373 A1* | 9/2016 | Fujita | ............... | B60K 35/00 |
| | | | | 116/334 |
| 2016/0311370 A1* | 10/2016 | Oyanagi | ............ | B60K 37/02 |
| 2017/0088048 A1* | 3/2017 | Iwamoto | ............ | B60Q 9/00 |
| 2017/0174081 A1* | 6/2017 | Nojiri | ................ | B60K 35/00 |
| 2018/0170180 A1* | 6/2018 | Smith | ............... | B60K 35/00 |
| 2018/0186235 A1* | 7/2018 | Van Laack | ............ | B60K 35/00 |

\* cited by examiner

TACHOMETER DISPLAY SYSTEM AND METHOD FOR DISPLAY

BACKGROUND

The embodiments relate generally to a motor vehicle, and in particular to a tachometer display system and method for a motor vehicle.

In a motor vehicle with a manual transmission, the engine and driven wheels are mechanically connected to each other through the transmission when the clutch of the transmission is engaged. During a downshift, engine speed ideally is matched to the speed of the transmission input shaft, or mainshaft, for smooth shifting. The driver matches the engine speed by quickly and momentarily pressing the accelerator pedal during the downshift to an appropriate depth to open the throttle a corresponding amount, thereby increasing the engine speed to the necessary amount to match the speed of the transmission input shaft. Conventional tachometers provide an indication of the engine speed to the driver. However, conventional tachometers typically do not provide an indication regarding transmission speed (e.g., the mainshaft speed) to the driver to assist with smooth shifting during a downshift.

SUMMARY

The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In one aspect, a tachometer display system is provided, comprising: a tachometer for indicating a plurality of engine speeds, wherein the tachometer is configured to display a current engine speed based on a current gear ratio of a manual transmission; and at least two synchronous shift point indicators displayed at variable locations near the tachometer, wherein each synchronous shift point indicator is displayed near a location on the tachometer associated with an engine speed that corresponds to a transmission input shaft speed for a downshifted gear ratio of the manual transmission from the current gear ratio.

In another aspect, a method for displaying synchronous shift point indicators on a tachometer display system is provided, the method comprising: providing a tachometer for indicating a plurality of engine speeds; displaying a current engine speed on the tachometer based on a current gear ratio of a manual transmission; displaying at least two synchronous shift point indicators at variable locations near the tachometer, wherein each synchronous shift point indicator is displayed near a location on the tachometer associated with an engine speed that corresponds to a transmission input shaft speed for a downshifted gear ratio of the manual transmission from the current gear ratio.

In another aspect, a method for displaying synchronous shift point indicators on a tachometer display system is provided, the method comprising: determining a first engine speed that corresponds to a first transmission input shaft speed for a first downshifted gear ratio of a manual transmission from a current gear ratio; comparing the first engine speed to a maximum permitted engine speed; upon determining that the first engine speed is not greater than the maximum permitted engine speed, displaying a first synchronous shift point indicator near a location of the first engine speed on a tachometer; and upon determining that the first engine speed exceeds the maximum permitted engine speed, preventing a display of the first synchronous shift point indicator on the tachometer.

Other systems, methods, features and advantages of the exemplary embodiments will be, or will become, apparent to one of ordinary skill in the art upon examination of the following figures and detailed description. It is intended that all such additional systems, methods, features and advantages be included within this description and this summary, be within the scope and protected by the claims.

BRIEF DESCRIPTION OF THE DRAWINGS

The exemplary embodiments can be better understood with reference to the following drawings and description. The components in the figures are not necessarily to scale. Moreover, in the figures, like reference numerals designate corresponding parts throughout the different views.

DETAILED DESCRIPTION

Figure 1:
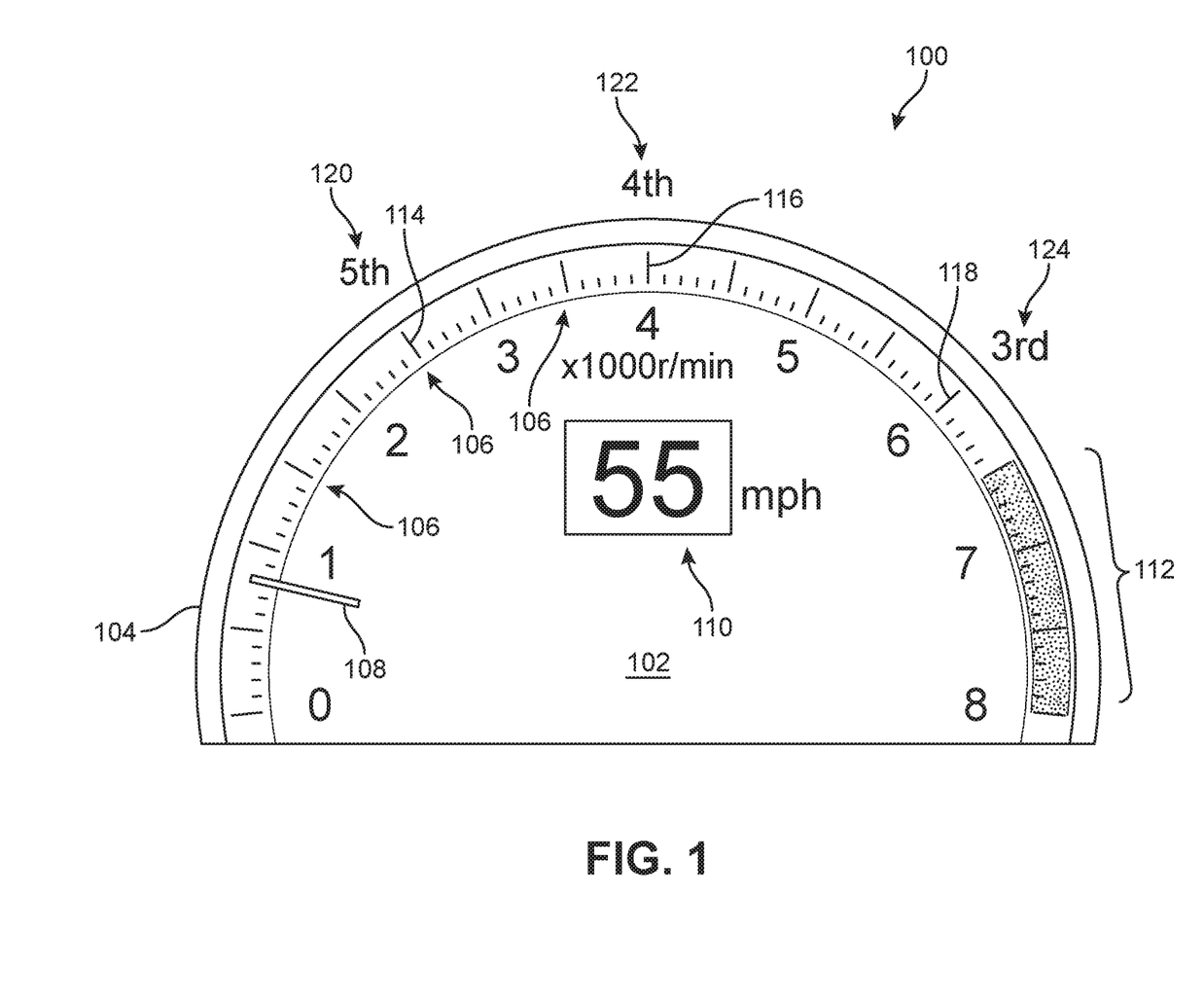
FIG. 1 is a schematic view of an example embodiment of a tachometer display system.

FIG. 1 illustrates a schematic diagram of an embodiment of a tachometer display system 100 for a motor vehicle. In an example embodiment, the tachometer display system 100 includes a tachometer 102 for indicating a plurality of engine speeds associated with an engine of the motor vehicle. In this embodiment, the tachometer 102 indicates the current engine speed of the motor vehicle on a dial 104 that includes a plurality of markers 106 corresponding to the plurality of engine speeds. As shown in FIG. 1, the current engine speed is indicated to a driver on the dial 104 by a needle 108 that points to the marker of the plurality of markers 106 that corresponds to the current engine speed. For example, in this embodiment, the needle 108 is pointing to a marker of the plurality of markers 106 that corresponds to an approximate engine speed of 800 revolutions per minute (rpm).

In some embodiments, tachometer display system 100 may include indicators associated with other vehicle information displayed to a driver. As shown in FIG. 1, a vehicle speed indicator 110 displays the current speed of the motor vehicle to the driver in units of miles per hour (mph). Additionally, a maximum permitted engine speed 112, also referred to as "redline", may be indicated on tachometer 102. In this embodiment, the maximum permitted engine speed 112 is shown on dial 104 of tachometer 102 using a different color or other indicia to distinguish the markers of the plurality of markers 106 that are at or above the maximum permitted engine speed 112. For example, as shown in FIG. 1, the maximum permitted engine speed 112 is 6500 rpm.

In an example embodiment, the tachometer display system 100 includes a display feature in which synchronous shift point indicators are displayed at variable locations near the tachometer 102 at locations associated with engine speeds that correspond to a transmission input shaft speed for a downshifted gear ratio of a manual transmission of the motor vehicle. That is, the displayed locations of the synchronous shift point indicators near the tachometer 102 represent the rotational engine speed for a downshift to the particular gear ratio of the manual transmission indicated to ensure a rev match or a "synchronous shift" at the current speed of the motor vehicle.

As shown in FIG. 1, the motor vehicle has a current speed of 55 mph and the current gear ratio of the manual transmission is $6^{th}$ gear. Accordingly, in this example, a driver would need to accelerate the engine speed to approximately 2500 rpm, 4000 rpm or 6000 rpm, respectively, for a downshift to $5^{th}$, $4^{th}$ or $3^{rd}$ gear under existing conditions (i.e., the current vehicle speed and the current gear ratio). As described above, the driver quickly and momentarily presses the accelerator pedal during the downshift to an appropriate depth to open the throttle a corresponding amount (i.e., "blipping") to increase the engine speed as needed to match the speed of the transmission input shaft. A first synchronous shift point indicator 120 is displayed near a first location 114 on the tachometer 102 associated with the engine speed (e.g., 2500 rpm) corresponding to the transmission input shaft speed for a first downshifted gear ratio (e.g., $5^{th}$ gear) of the manual transmission from the current gear ratio (e.g., $6^{th}$ gear).

According to the example embodiments described herein, additional synchronous shift point indicators are also displayed on the tachometer display system 100 for other downshifted gear ratios. In this embodiment, a second synchronous shift point indicator 122 is displayed near a second location 116 on the tachometer 102 associated with the engine speed (e.g., 4000 rpm) corresponding to the transmission input shaft speed for a second downshifted gear ratio (e.g., $4^{th}$ gear) of the manual transmission from the current gear ratio (e.g., $6^{th}$ gear). A third synchronous shift point indicator 124 is also displayed near a third location 118 on the tachometer 102 associated with the engine speed (e.g., 6000 rpm) corresponding to the transmission input shaft speed for a third downshifted gear ratio (e.g., $3^{rd}$ gear) of the manual transmission from the current gear ratio (e.g.; $6^{th}$ gear). With this arrangement, the synchronous shift point indicators may provide assistance to a driver for executing smooth downshifting of the manual transmission.

In an example embodiment, the tachometer display system 100 may be provided at least partially in the form of a graphical user interface, for example, a display screen or LCD panel. The synchronous shift point indicators, including each of the first synchronous shift point indicator 120, the second synchronous shift point indicator 122, and the third synchronous shift point indicator 124, may be displayed on the tachometer display system 100 using the graphical user interface. In some embodiments, the tachometer 102 may also be represented in digital form on the graphical user interface of the tachometer display system 100. For example, as shown in FIG. 1, the tachometer 102 is digitally represented on the graphical user interface of the tachometer display system 100 in the form of the dial 104. In other embodiments, the tachometer 102 may be an analog gauge that is surrounded by the graphical user interface for displaying the synchronous shift point indicators 120, 122, 124.

In embodiments where the tachometer 102 is in the form of a dial, including analog or digital form, each of the synchronous shift point indicators may be located radially outward of the dial. For example, as shown in FIG. 1, each of the first synchronous shift point indicator 120, the second synchronous shift point indicator 122, and the third synchronous shift point indicator 124 is located radially outward of the dial 104 near the location of the engine speed that corresponds to the transmission input shaft speed for the synchronous shift.

Figure 2:
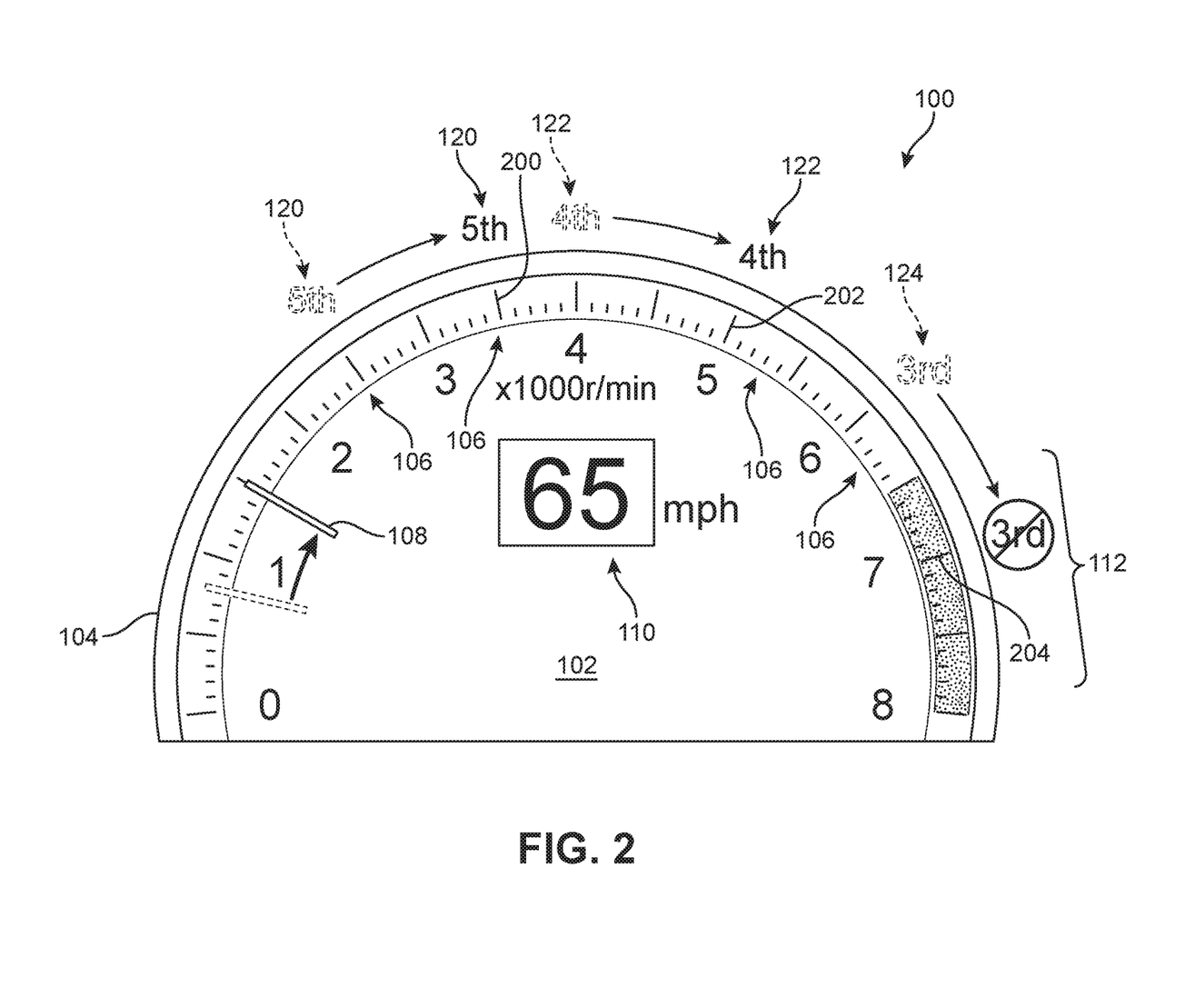
FIG. 2 is a schematic view of the example embodiment of the tachometer display system associated with a different engine speed.

According to the techniques of the example embodiments described herein, the locations near the tachometer for the synchronous shift point indicators are variable based on at least the current vehicle speed and the current gear ratio of the manual transmission. As a result, the locations for the synchronous shift point indicators automatically adjust in response to changes in the vehicle speed and/or the current gear ratio. Referring now to FIG. 2, a schematic diagram of the example embodiment of the tachometer display system 100 is shown associated with a different engine speed than the engine speed shown in FIG. 1.

In this embodiment, the current vehicle speed as shown by the vehicle speed indicator 110 has changed from 55 mph in the example depicted in FIG. 1 to 65 mph in the example depicted in FIG. 2 and the current gear ratio of the manual transmission remains in $6^{th}$ gear. Based on this change in current vehicle speed, the locations for the synchronous shift point indicators change in response. In this case, the motor vehicle is traveling at a higher speed and has a higher current engine speed, as depicted by the needle 108 that points to a marker of the plurality of markers 106 that corresponds to an approximate engine speed of 1400 rpm.

Accordingly, in this example, a driver would need to accelerate the engine speed to approximately 3500 rpm, 5000 rpm or 7000 rpm; respectively, for a downshift to $5^{th}$, $4^{th}$ or $3^{rd}$ gear under existing conditions (i.e., the current vehicle speed and the current gear ratio). The first synchronous shift point indicator 120 is now displayed near a fourth location 200 on the tachometer 102 associated with the engine speed (e.g., 3500 rpm) corresponding to the transmission input shaft speed for the first downshifted gear ratio (e.g., $5^{th}$ gear) of the manual transmission from the current gear ratio (e.g., $6^{th}$ gear). In other words, the location for the first synchronous shift point indicator 120 has dynamically moved from near the first location 114 to the fourth location 200 on the tachometer 102 based on the change in the current vehicle speed.

In this embodiment, the second synchronous shift point indicator 122 is now displayed near a fifth location 202 on the tachometer 102 associated with the engine speed (e.g., 5000 rpm) corresponding to the transmission input shaft speed for the second downshifted gear ratio (e.g., $4^{th}$ gear) of the manual transmission from the current gear ratio (e.g., $6^{th}$ gear). In this example, the location for the second synchronous shift point indicator 122 has also dynamically moved from near the second location 116 to the fifth location 202 on the tachometer 102 based on the change in the current vehicle speed.

In some embodiments, the tachometer display system 100 may include a redline lockout feature where a synchronous shift point indicator is prevented from being displayed when the engine speed corresponding to the transmission input shaft speed for the downshifted gear ratio would exceed the maximum permitted engine speed (i.e., redline).

As shown in FIG. 2, based on the change in the current vehicle speed, the third synchronous shift point indicator 124 would now be displayed near a sixth location 204 on the tachometer 102 associated with the engine speed (e.g., 7000 rpm) corresponding to the transmission input shaft speed for the third downshifted gear ratio (e.g., $3^{rd}$ gear) of the manual transmission from the current gear ratio (e.g., $6^{th}$ gear). According to the redline lockout feature described herein, however, in this example the third synchronous shift point indicator 124 is not displayed near the sixth location 204 on the tachometer 102. That is, because the new location for the third synchronous shift point indicator 124 would be at or above the maximum permitted engine speed 112, the third synchronous shift point indicator 124 is prevented from being displayed near the sixth location 204 on the tachometer 102. With this arrangement, the synchronous shift point indicators may provide assistance to a driver for executing smooth downshifting of the manual transmission while also preventing an accidental downshift into a gear ratio that would exceed a maximum permitted engine speed.

Figure 3:
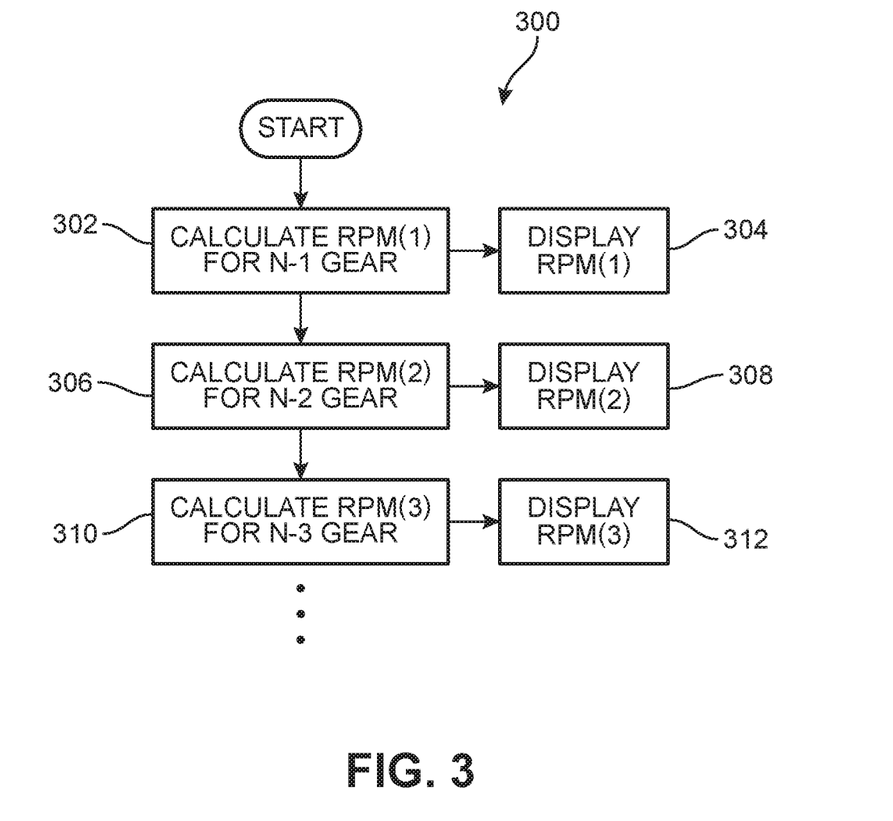
FIG. 3 is a flowchart of an example embodiment of a method for displaying synchronous shift point indicators on a tachometer display system.

Referring now to FIG. 3, a flowchart of an example embodiment of a method 300 for displaying synchronous shift point indicators on a tachometer display system is shown. In an example embodiment, method 300 may be implemented on the tachometer display system 100, described above. As shown in FIG. 3, method 300 may being at an operation 302 where a first engine speed (RPM(1)) is determined or calculated to correspond to a transmission input shaft speed for a first downshifted gear ratio (N−1 gear). For example, if the manual transmission of a motor vehicle is currently in $6^{th}$ gear, the first downshifted gear ratio would be $5^{th}$ gear N−1 gear, where N is 6 in this example).

Upon determination or calculation of the first engine speed that corresponds to the transmission input shaft speed for the first downshifted gear ratio at operation 302, method 300 proceeds to an operation 304. At operation 304, a first synchronous shift point indicator is displayed near a location on the tachometer associated with the first engine speed. For example, at operation 304, the first synchronous shift point indicator 120 may displayed near the first location 114 on the tachometer 102, as shown in FIG. 1 above.

Next, method 300 proceeds to an operation 306, where a second engine speed (RPM(2)) is determined or calculated to correspond to a transmission input shaft speed for a second downshifted gear ratio (N−2 gear). For example, if the manual transmission of a motor vehicle is currently in $6^{th}$ gear, the second downshifted gear ratio would be $4^{th}$ gear (i.e., N−2 gear, where N is 6 in this example).

Upon determination or calculation of the second engine speed that corresponds to the transmission input shaft speed for the second downshifted gear ratio at operation 306, method 300 proceeds to an operation 308. At operation 308, a second synchronous shift point indicator is displayed near a location on the tachometer associated with the second engine speed. For example, at operation 308, the second synchronous shift point indicator 122 may displayed near the second location 116 on the tachometer 102, as shown in FIG. 1 above.

In some embodiments, two or more synchronous shift point indicators may be displayed on the tachometer display system 100. In cases where more than two synchronous shift point indicators are displayed, method 300 may proceed to an operation 310, where a third engine speed (RPM(3)) is determined or calculated to correspond to a transmission input shaft speed for a third downshifted gear ratio (N−3 gear). For example, if the manual transmission of a motor vehicle is currently in $6^{th}$ gear, the third downshifted gear ratio would be $3^{rd}$ gear (i.e., N−3 gear, where N is 6 in this example).

Upon determination or calculation of the third engine speed that corresponds to the transmission input shaft speed for the third downshifted gear ratio at operation 310, method 300 proceeds to an operation 312. At operation 312, a third synchronous shift point indicator is displayed near a location on the tachometer associated with the third engine speed. For example, at operation 312, the third synchronous shift point indicator 124 may displayed near the third location 118 on the tachometer 102, as shown in FIG. 1 above.

Method 300 may end upon display of the third synchronous shift point indicator. In other embodiments, method 300 may continue in a similar manner to display additional synchronous shift point indicators. In addition, in some embodiments, the number of synchronous shift point indicators simultaneously displayed on the tachometer display system 100 may be limited to a predetermined number.

Figure 4:
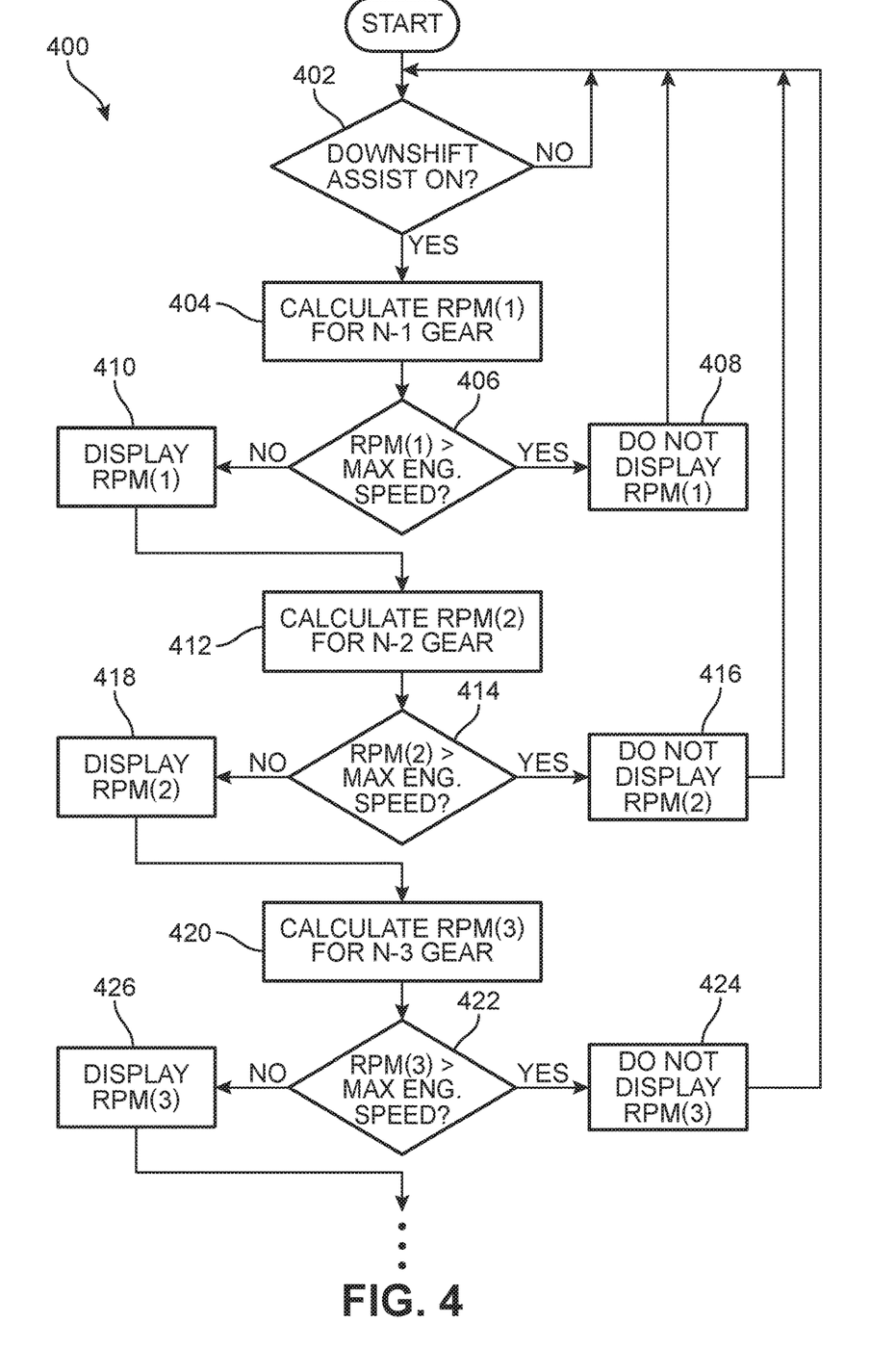
FIG. 4 is a flowchart of an alternate embodiment of a method for displaying synchronous shift point indicators on a tachometer display system.

As described above, in some embodiments, a redline lockout feature may be implemented in connection with the method for displaying synchronous shift point indicators. FIG. 4 is a flowchart of an alternate embodiment of a method 400 for displaying synchronous shift point indicators on a tachometer display system with a redline lockout feature. In an example embodiment, method 400 may be implemented on the tachometer display system 100, described above.

In some embodiments, a driver may optionally select whether or not synchronous shift point indicators are displayed on the tachometer display system 100. In embodiments where a driver is provided with the option to selectively engage the synchronous shift point indicators, method 400 begins at an operation 402. At operation 402, whether or not downshift assistance (i.e., display of the synchronous shift point indicators) is engaged or turned on is determined. If the result at operation 402 is "No", downshift assistance is not turned on, then method 400 returns to the start until downshift assistance is requested. If the result at operation 402 is "Yes", downshift assistance is turned on, then method 400 proceeds to an operation 404. In embodiments without an option to selectively engage or disengage downshift assistance, method 400 may begin at operation 404.

At operation 404, a first engine speed (RPM(1)) is determined or calculated to correspond to a transmission input shaft speed for a first downshifted gear ratio (N−1 gear). For example, if the manual transmission of a motor vehicle is currently in $6^{th}$ gear, the first downshifted gear ratio would be $5^{th}$ gear (i.e., N−1 gear, where N is 6 in this example).

Next, method 400 proceeds to an operation 406 where whether or not the first engine speed (RPM(1)) from operation 404 exceeds a maximum permitted engine speed is determined.

Upon determining at operation 406 that the first engine speed (RPM(1)) exceeds the maximum permitted engine speed, then method 400 proceeds to an operation 408. At operation 408, a synchronous shift point indicator for the first downshifted gear ratio is prevented from being displayed near the location on the tachometer associated with the first engine speed and method 400 returns to the beginning. That is, when the synchronous shift point indicator would be displayed near an engine speed that exceeds the maximum permitted engine speed (i.e., "redline"), the synchronous shift point indicator is not displayed.

For example, as shown in FIG. 2, because the third synchronous shift point indicator 124 would be at or above the maximum permitted engine speed 112, the third synchronous shift point indicator 124 is prevented from being displayed near the sixth location 204 on the tachometer 102. With this arrangement, because a downshift would cause the engine speed to rise above the maximum permitted speed, the redline lockout feature of the present embodiment prevents display of the synchronous shift point indicator for that downshift to the driver. In this way, the redline lockout feature assists with preventing an accidental downshift into a gear ratio that would exceed a maximum permitted engine speed, which may cause damage to the engine, transmission, and/or other driveline components.

Referring back to FIG. 4, upon determination that the first engine speed corresponding to the transmission input shaft speed for the first downshifted gear ratio does not exceed the maximum permitted engine speed at operation 406, method 400 proceeds to an operation 410. At operation 410, a first synchronous shift point indicator is displayed near a location on the tachometer associated with the first engine speed. For example, at operation 410, the first synchronous shift point indicator 120 may displayed near the first location 114 on the tachometer 102, as shown in FIG. 1 above.

Next, method 400 proceeds to an operation 412, where a second engine speed (RPM(2)) is determined or calculated to correspond to a transmission input shaft speed for a second downshifted gear ratio (N−2 gear). For example, if the manual transmission of a motor vehicle is currently in $6^{th}$ gear, the second downshifted gear ratio would be $4^{th}$ gear (i.e., N−2 gear, where N is 6 in this example).

Method 400 proceeds to an operation 414 where whether or not the second engine speed (RPM(2)) from operation 412 exceeds a maximum permitted engine speed is determined. Upon determining at operation 414 that the second engine speed (RPM(2)) exceeds the maximum permitted engine speed, then method 400 proceeds to an operation 416, where a synchronous shift point indicator for the second downshifted gear ratio is prevented from being displayed and method 400 returns to the beginning.

Upon determination that the second engine speed corresponding to the transmission input shaft speed for the second downshifted gear ratio does not exceed the maximum permitted engine speed at operation 414, method 400 proceeds to an operation 418. At operation 418, a second synchronous shift point indicator is displayed near a location on the tachometer associated with the second engine speed. For example, at operation 418, the second synchronous shift point indicator 122 may displayed near the second location 116 on the tachometer 102, as shown in FIG. 1 above.

In some embodiments, two or more synchronous shift point indicators may be displayed on the tachometer display system 100. In cases where more than two synchronous shift point indicators are displayed, method 400 may proceed to an operation 420, where a third engine speed (RPM(3)) is determined or calculated to correspond to a transmission input shaft speed for a third downshifted gear ratio (N−3 gear), For example, if the manual transmission of a motor vehicle is currently in $6^{th}$ gear, the third downshifted gear ratio would be $3^{rd}$ gear (i.e., N−3 gear, where N is 6 in this example).

Method 400 proceeds to an operation 422 where whether or not the third engine speed (RPM(3)) from operation 420 exceeds a maximum permitted engine speed is determined. Upon determining at operation 422 that the third engine speed (RPM(3)) exceeds the maximum permitted engine speed, then method 400 proceeds to an operation 424, where a synchronous shift point indicator for the third downshifted gear ratio is prevented from being displayed and method 400 returns to the beginning.

Upon determination that the third engine speed corresponding to the transmission input shaft speed for the third downshifted gear ratio does not exceed the maximum permitted engine speed at operation 422, method 400 proceeds to an operation 426. At operation 426, a third synchronous shift point indicator is displayed near a location on the tachometer associated with the third engine speed. For example, at operation 426, the third synchronous shift point indicator 124 may displayed near the third location 118 on the tachometer 102, as shown in FIG. 1 above.

Method 400 may end upon display of the third synchronous shift point indicator. In other embodiments, method 400 may continue in a similar manner to display additional synchronous shift point indicators. In addition, in some embodiments, the number of synchronous shift point indicators simultaneously displayed on the tachometer display system 100 may be limited to a predetermined number.

Figure 5:
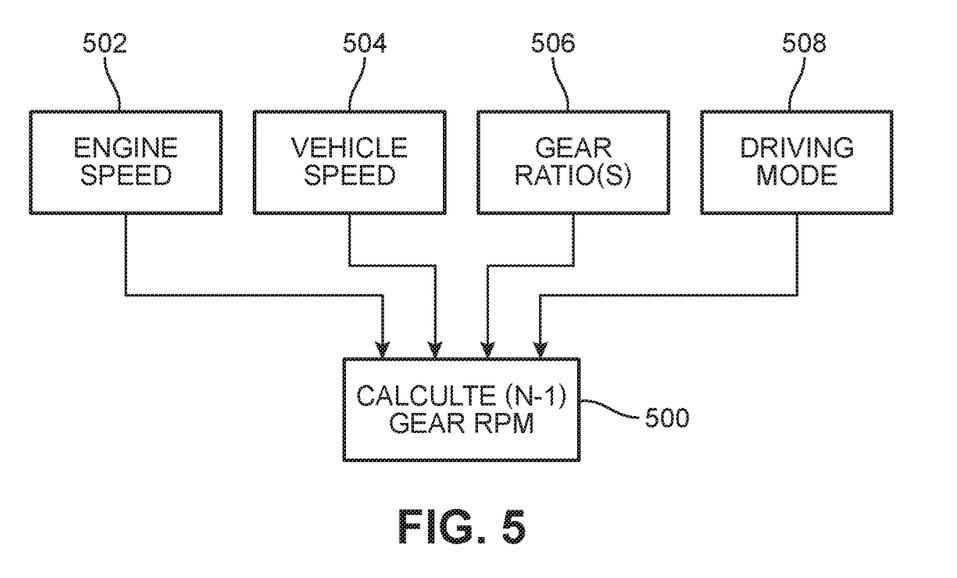
FIG. 5 is a schematic view of an example embodiment for calculating an engine speed for a downshifted gear ratio.

In some embodiments, determination or calculation of an engine speed that corresponds to a transmission input shaft speed for a downshifted gear ratio may be based on a plurality of inputs, including vehicle characteristics and/or options. FIG. 5 is a schematic view of an example embodiment for calculating an engine speed for a downshifted gear ratio. In this embodiment, the engine speed is being determined or calculated for a first engine speed (RPM(1)) 500 that corresponds to a transmission input shaft speed for a first downshifted gear ratio (N−1 gear).

In this embodiment, a plurality of inputs may be used as part of the determination for the first engine speed 500. The plurality of inputs include a current engine speed 502, a current vehicle speed 504, and gear ratios 506 associated with the manual transmission of the motor vehicle. The plurality of inputs 502, 504, 506 may be obtained from sensors on the motor vehicle. For example, the current engine speed 502 may be obtained from an engine speed sensor (not shown) configured to measure a rotational speed of an engine of the motor vehicle. The current vehicle speed 504 may be obtained from a vehicle speed sensor (not shown) configured to measure a vehicle speed of the motor vehicle. Gear ratios 506 are specific to a configuration of a manual transmission. In some cases, gear ratios 506 associated with the manual transmission of the motor vehicle may be stored in a data structure or memory for use as part of the determination for the first engine speed 500.

Additionally, in some embodiments, other optional inputs may be used as part of the determination for the first engine speed 500. In this embodiment, a driving mode selection 508 may be used as an optional input. The driving mode selection 508 may provide a driver with different driving modes having varied characteristics. For example, one driving mode may be oriented for performance, with a corresponding higher maximum permitted engine speed and higher shift points for the manual transmission to provide for more aggressive shifting. Another driving mode may be oriented for economy, with lower shift points for the manual transmission to provide for better fuel economy. Additional driving modes may also be provided with different characteristics.

In some embodiments, the maximum permitted engine speed may be determined dynamically or based on one or more inputs from other sensors of the motor vehicle. For example, in one embodiment, the maximum permitted engine speed may change in relation to the operating temperature of the engine, including engine oil temperature, coolant temperature, and/or ambient temperature. The maximum permitted engine speed may also vary based on selected driving mode, as described above.

Figure 6:
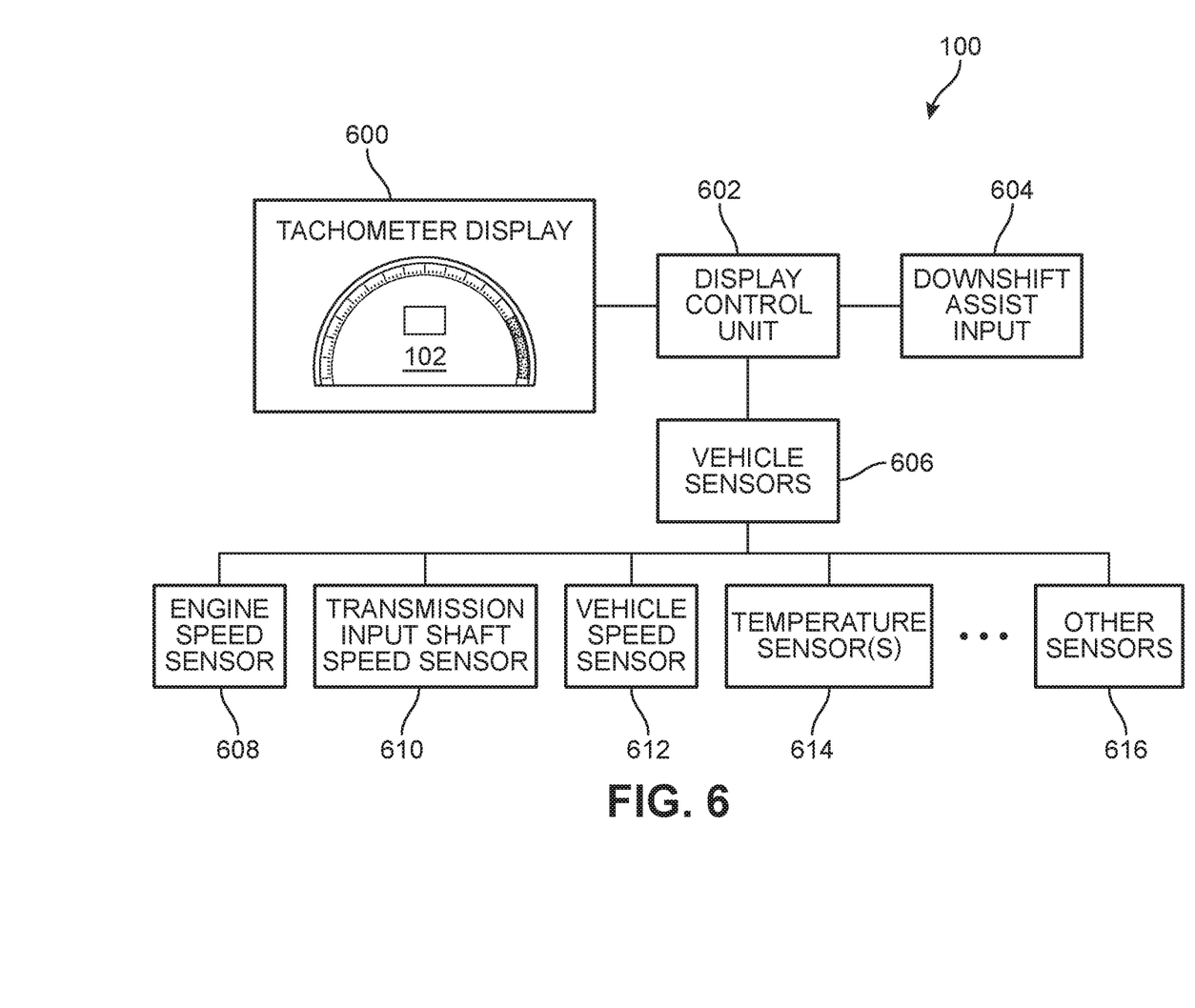
FIG. 6 is a block diagram of an example embodiment of a tachometer display system.

FIG. 6 is a block diagram of an example embodiment of the tachometer display system 100. In this embodiment, the tachometer display system 100 includes a display area 600 configured to display the tachometer 102 and the synchronous shift point indicators, including one or more of the first synchronous shift point indicator 120, the second synchronous shift point indicator 122, or the third synchronous shift point indicator 124, described above. In some embodiments, display area 600 may include a graphical user interface. In other embodiments, display area 600 may also include analog gauges.

In this embodiment, the tachometer display system 100 includes a display control unit 602 that is in communication with the display area 600. Display control unit 602 may be a computer or similar device. In some embodiments, the display control unit 602 may be implemented by an electronic control unit (ECU) of the motor vehicle that is configured to communicate with, and/or control, various components and operations of the motor vehicle. In addition, in some embodiments, the ECU may be configured to control additional components of a motor vehicle that are not shown. Display control unit 602 may include a processor and a memory that is configured to store instructions to be executed by the processor for implementing the operations associated with the methods described herein. In addition, gear ratios associated with the manual transmission of the motor vehicle may be stored in memory or other data structure of the display control unit.

In some embodiments, the tachometer display system 100 may include a downshift assist input 604. Downshift assist input 604 may be provided to allow a driver to optionally engage or disengage the downshift assistance feature of the present embodiments for displaying the synchronous shift point indicators, as described above.

Display control unit 602 may be in communication with a plurality of vehicle sensors 606 that are used by the display control unit 602 to determine engine speeds and other related information, as described in reference to the methods of FIGS. 3 and 4 above. In this embodiment, for example, the vehicle sensors 606 include an engine speed sensor 608 configured to measure a rotational speed of an engine of the motor vehicle, a transmission input shaft speed sensor 610 configured to measure a rotational speed of a mainshaft of a manual transmission of the motor vehicle, and a vehicle speed sensor 612 configured to measure a vehicle speed of the motor vehicle. The vehicle sensors 606 may further include one or more temperature sensors 614 configured to measure temperatures associated with fluids of the engine and/or transmission of the motor vehicle. Additionally, the vehicle sensors 606 may include other sensors 616, including a driving mode selection sensor or other sensors associated with vehicle characteristics or options.

In some embodiments, some of the items shown in FIG. 6 can be a housed in a single case or unit. In other embodiments, the various items shown in FIG. 6 are not housed in a single physical case, but instead, are distributed throughout the motor vehicle and communicate with one another via known wired or wireless methods.

Figure 7:
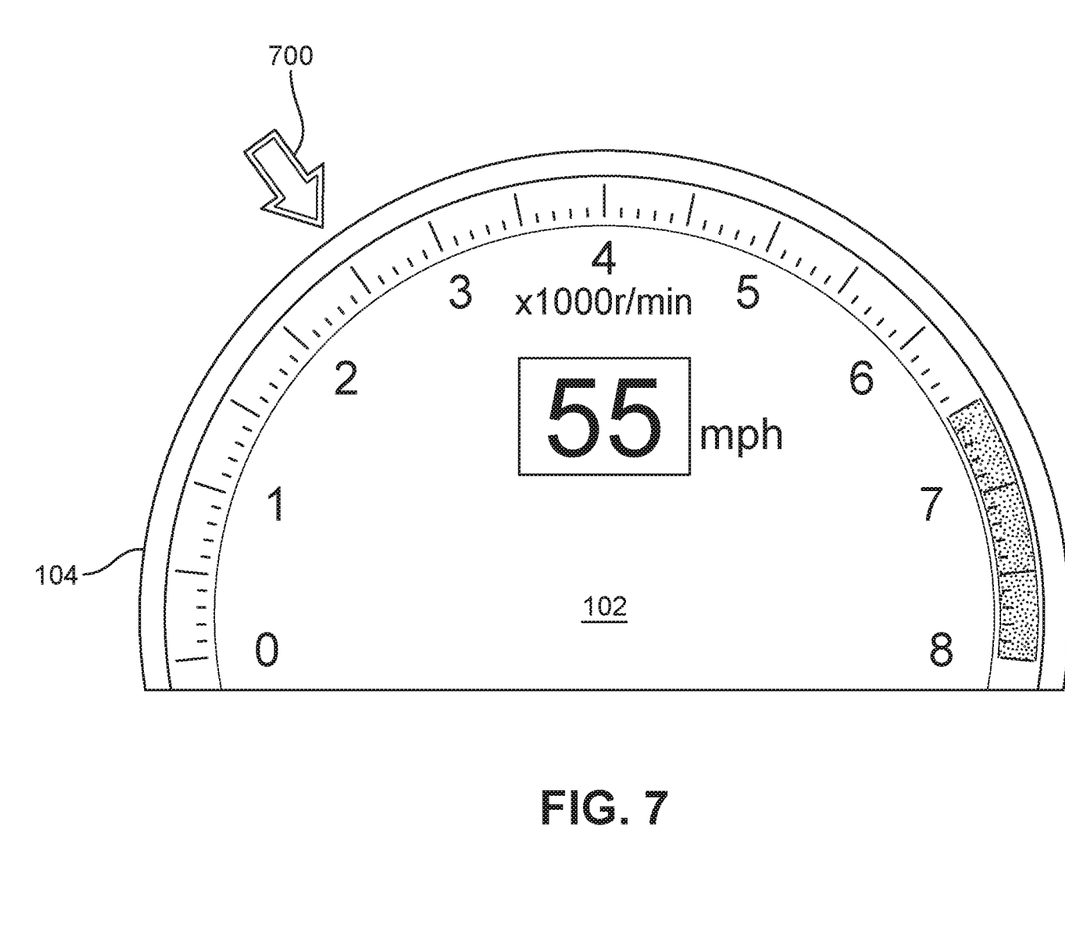
FIG. 7 is a representative view of an alternate embodiment of a synchronous shift point indicator.
Figure 8:
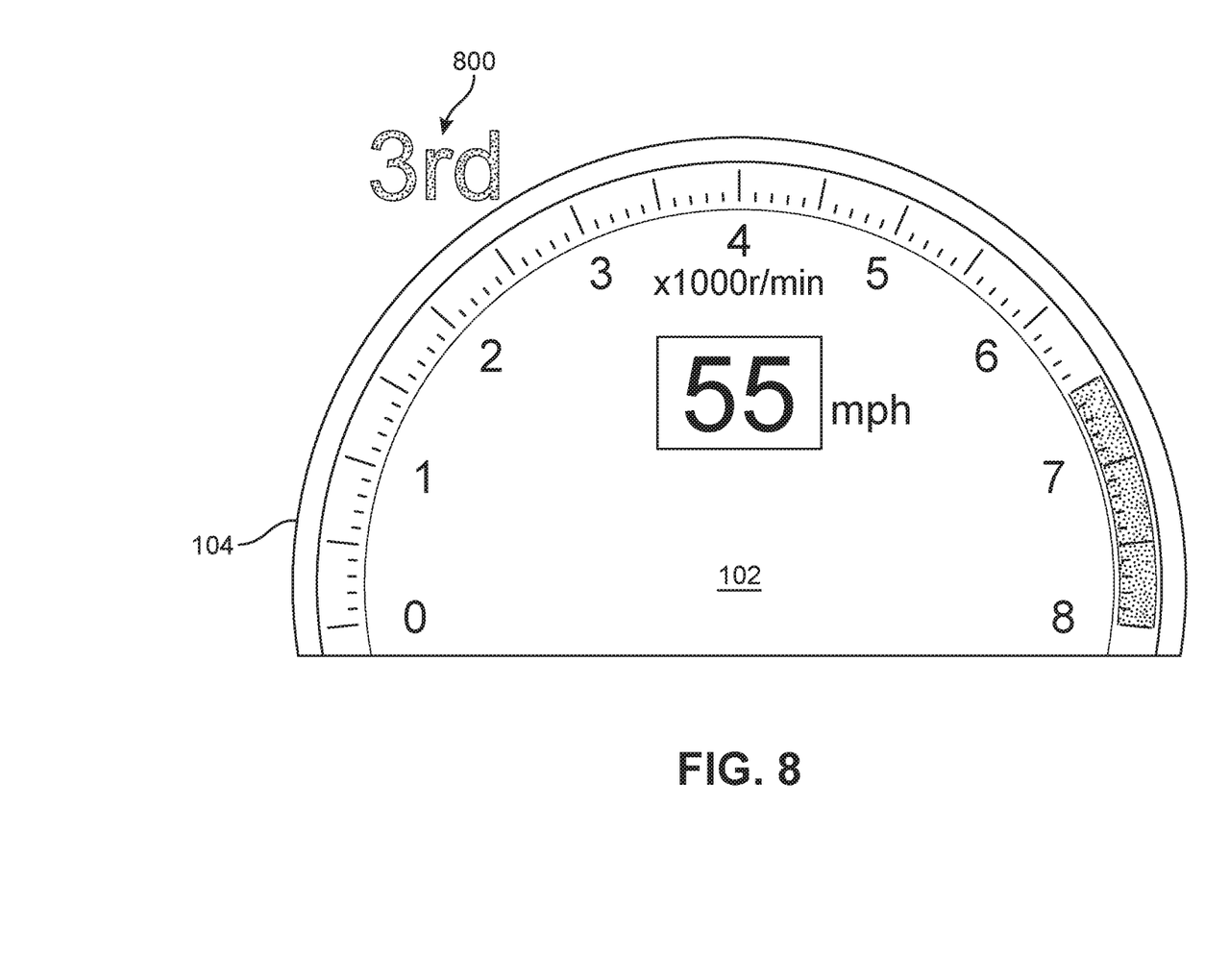
FIG. 8 is a representative view of another alternate embodiment of a synchronous shift point indicator.

In the example embodiments shown in FIGS. 1-6, the synchronous shift point indicators are in the form of a number corresponding to the downshifted gear ratio for the corresponding synchronous shift point indicator. For example, the synchronous shift point indicator for $5^{th}$ gear in FIG. 1 (e.g., first synchronous shift point indicator 120) is shown on the tachometer display system 100 as "$5^{th}$". In other embodiments, different symbols and/or indicia may be used to represent synchronous shift point indicators. FIGS. 7 and 8 illustrate some alternate embodiments of synchronous shift point indicators according to the principles of the embodiments described herein.

Referring now to FIG. 7, a representative diagram of an alternate embodiment of a synchronous shift point indicator 700 is shown in relation to the tachometer 102. In this embodiment, synchronous shift point indicator 700 is in the form of an arrow that points to the engine speed marker of the plurality of markers 106 on the tachometer 102 that corresponds to a transmission input shaft speed for a downshifted gear ratio. Additionally, in embodiments where two or more synchronous shift point indicators are displayed on the tachometer display system 100, each arrow may be a different size for each of the synchronous shift point indicators. For example, the first downshifted gear ratio (N–1 gear) may be a larger arrow than the second downshifted gear ratio (N–2 gear). It should be understood other configurations may be provided.

Referring now to FIG. 8, a representative diagram of another alternate embodiment of a synchronous shift point indicator 800 is shown in relation to the tachometer 102. In this embodiment, synchronous shift point indicator 800 is in the form of a colored symbol located near the engine speed marker of the plurality of markers 106 on the tachometer 102 that corresponds to a transmission input shaft speed for a downshifted gear ratio. Additionally, in embodiments where two or more synchronous shift point indicators are displayed on the tachometer display system 100, each colored symbol may be a different color for each of the synchronous shift point indicators. For example, the first downshifted gear ratio (N–1 gear) may be a first color (e.g.; green), the second downshifted gear ratio (N–2 gear) may be a second color (e.g., yellow), and the third downshifted gear ratio (N–3 gear) may be a third color (e.g., red), It should be understood other configurations may be provided.

While various embodiments have been described, the description is intended to be exemplary, rather than limiting and it will be apparent to those of ordinary skill in the art that many more embodiments and implementations are possible that are within the scope of the claims. Additionally, one or more of the various embodiments described above may be combined in part or in whole in accordance with the principles described herein. Accordingly, the embodiments are not to be restricted except in light of the attached claims and their equivalents. Also, various modifications and changes may be made within the scope of the attached claims.

What is claimed is:

1. A tachometer display system comprising:
   a tachometer for indicating a plurality of engine speeds, wherein the tachometer is configured to display a current engine speed based on a current gear ratio of a manual transmission; and
   at least two synchronous shift point indicators displayed at variable locations near the tachometer, wherein each synchronous shift point indicator is displayed near a location on the tachometer associated with an engine speed that corresponds to a transmission input shaft speed for a downshifted gear ratio of the manual transmission from the current gear ratio; and
   wherein, in response to an engine speed that corresponds to the transmission input shaft speed for the downshifted gear ratio of the manual transmission from the current gear ratio that exceeds a maximum permitted engine speed, a display of a synchronous shift point indicator for the downshifted gear ratio is prevented.

2. The tachometer display system of claim 1, further comprising:

a graphical user interface configured to display the tachometer and the at least two synchronous shift point indicators.

3. The tachometer display system of claim 1,
wherein the tachometer is a dial; and
wherein the at least two synchronous shift point indicators are located radially outward of the dial.

4. The tachometer display system of claim 1, wherein each of the at least two synchronous shift point indicators comprises a number corresponding to the downshifted gear ratio.

5. The tachometer display system of claim 1, wherein the at least two synchronous shift point indicators comprises a different color than a color of markers associated with the plurality of engine speeds on the tachometer.

6. The tachometer display system of claim 1, wherein each of the at least two synchronous shift point indicators comprises an arrow.

7. The tachometer display system of claim 1, wherein the variable locations of the at least two synchronous shift point indicators are determined based on at least a current vehicle speed and the current gear ratio of the manual transmission.

8. A method for displaying synchronous shift point indicators on a tachometer display system, the method comprising:
providing a tachometer for indicating a plurality of engine speeds;
displaying a current engine speed on the tachometer based on a current gear ratio of a manual transmission;
displaying at least two synchronous shift point indicators at variable locations near the tachometer, wherein each synchronous shift point indicator is displayed near a location on the tachometer associated with an engine speed that corresponds to a transmission input shaft speed for a downshifted gear ratio of the manual transmission from the current gear ratio;
determining a maximum permitted engine speed; and
upon determining that an engine speed that corresponds to the transmission input shaft speed for the downshifted gear ratio of the manual transmission from the current gear ratio exceeds the maximum permitted engine speed, preventing a display of a synchronous shift point indicator for the downshifted gear ratio.

9. The method of claim 8, further comprising:
displaying the tachometer and the at least two synchronous shift point indicators on a graphical user interface.

10. The method of claim 8, wherein the tachometer is a dial; and
locating the at least two synchronous shift point indicators radially outward of the dial.

11. The method of claim 8, wherein each of the at least two synchronous shift point indicators comprises at least one of:
a number corresponding to the downshifted gear ratio;
a different color than a color of markers associated with the plurality of engine speeds on the tachometer; or
an arrow.

12. The method of claim 8, further comprising:
determining the variable locations of the at least two synchronous shift point indicators based on at least a current vehicle speed and the current gear ratio of the manual transmission.

13. The method of claim 8, wherein the maximum permitted engine speed is variable based on at least one vehicle characteristic.

14. A method for displaying synchronous shift point indicators on a tachometer display system, the method comprising:
determining a first engine speed that corresponds to a first transmission input shaft speed for a first downshifted gear ratio of a manual transmission from a current gear ratio;
comparing the first engine speed to a maximum permitted engine speed;
upon determining that the first engine speed is not greater than the maximum permitted engine speed, displaying a first synchronous shift point indicator near a location of the first engine speed on a tachometer; and
upon determining that the first engine speed exceeds the maximum permitted engine speed, preventing a display of the first synchronous shift point indicator on the tachometer.

15. The method of claim 14, further comprising:
determining a second engine speed that corresponds to a second transmission input shaft speed for a second downshifted gear ratio of the manual transmission from the current gear ratio; and
upon determining that the second engine speed is not greater than the maximum permitted engine speed, displaying a second synchronous shift point indicator near a location of the second engine speed on the tachometer.

16. The method of claim 14, further comprising:
displaying the tachometer and the first synchronous shift point indicator on a graphical user interface.

17. The method of claim 14, wherein the tachometer is a dial; and
wherein displaying the first synchronous shift point indicator comprises locating the first synchronous shift point indicator radially outward of the dial.

18. The method of claim 14, wherein the first synchronous shift point indicator comprises at least one of:
a number corresponding to the first downshifted gear ratio;
a different color than a color of markers associated with a plurality of engine speeds marked on the tachometer; or
an arrow.

19. The method of claim 14, further comprising:
determining variable locations of two or more synchronous shift point indicators displayed near the tachometer based on at least a current vehicle speed and the current gear ratio of the manual transmission.

20. The method of claim 14, wherein the maximum permitted engine speed is variable based on at least one vehicle characteristic.

* * * * *